UNITED STATES PATENT OFFICE.

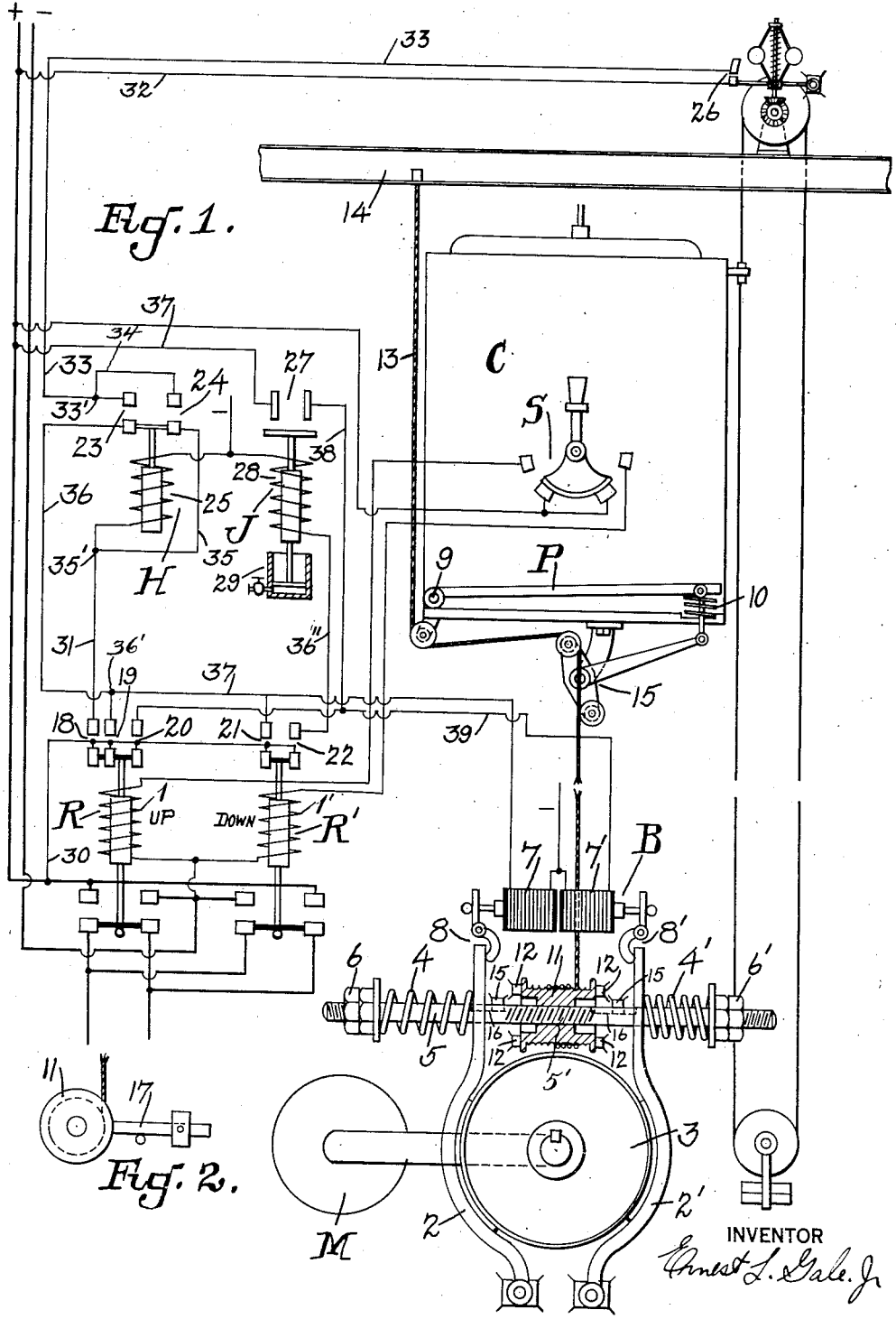

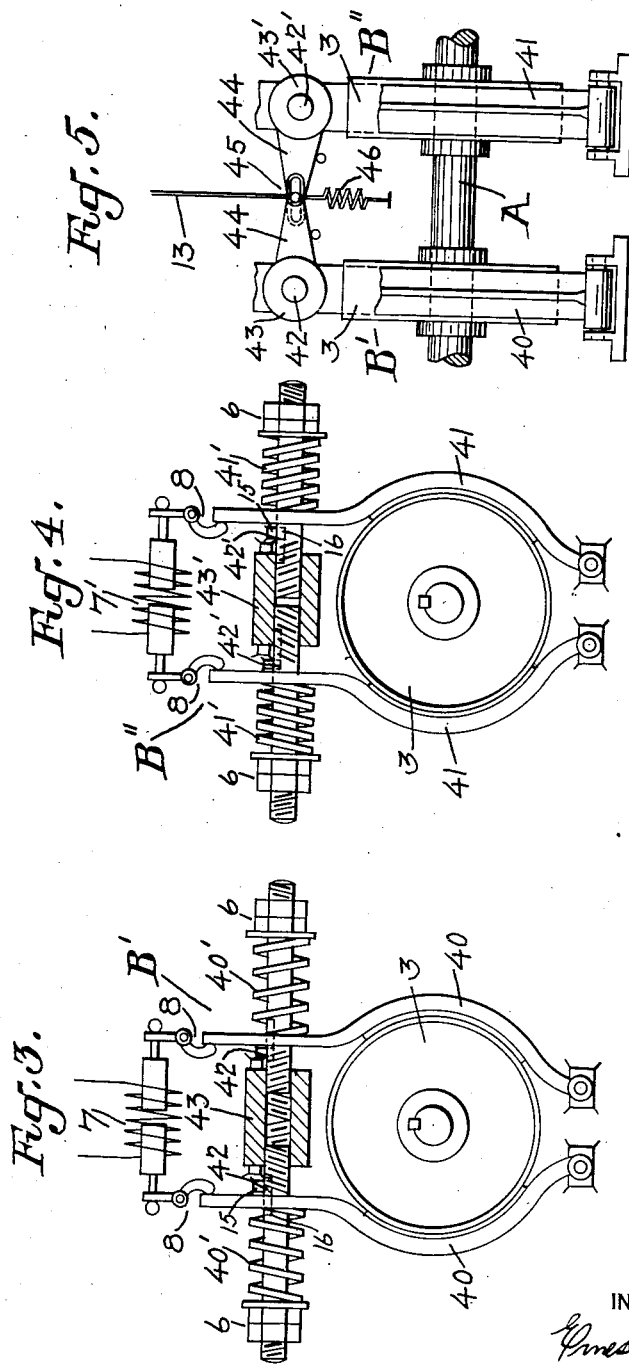

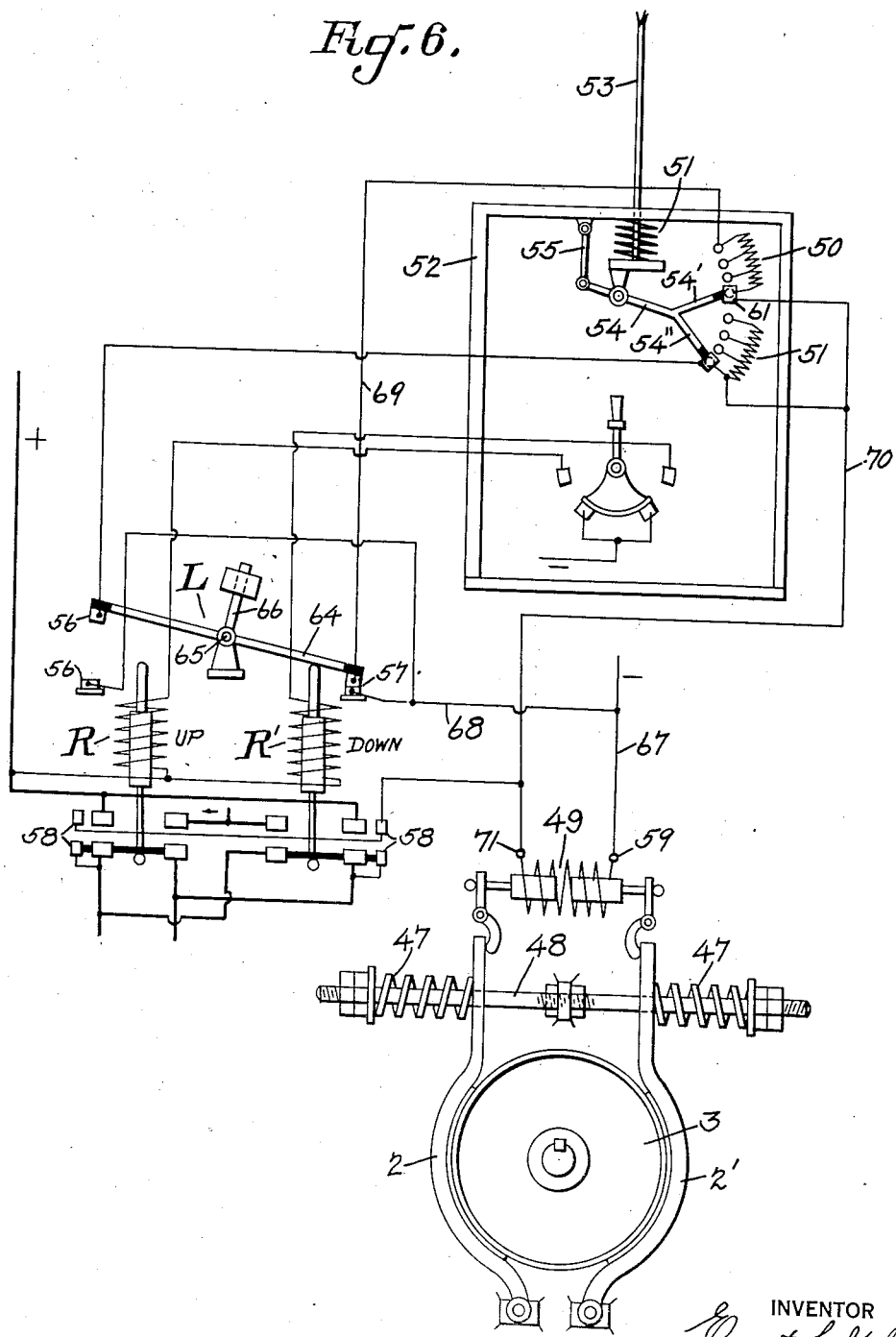

ERNEST L. GALE, JR., OF YONKERS, NEW YORK.

ELECTROMECHANICAL BRAKE APPARATUS.

1,304,870.

Specification of Letters Patent.

Patented May 27, 1919.

Application filed February 15, 1917. Serial No. 148,889.

*To all whom it may concern:*

Be it known that I, ERNEST L. GALE, Jr., a citizen of the United States, residing in Yonkers, in the county of Westchester and State of New York, have invented a new and useful Improvement in Electromechanical Brake Apparatus, of which the following is a specification.

My invention relates to brake apparatus more particularly of the electro-mechanical type such as is used in connection with elevators, and in which the brake is released by an electro-magnet or motor, and applied mechanically by a spring or its equivalent.

One of the objects of the invention is to provide means automatically to vary the retarding force or power of the brake-applying means in accordance with the load in the elevator car.

Other objects of the invention are to provide light and hard braking actions or retarding forces, these constituting selective retarding forces; and further to provide means automatically to control the brake to effect a harder braking action for a heavy load descending and a light load ascending, than for a light load descending and a heavy load ascending.

In the electro-mechanical type of brake now in common use, the initial braking action or retarding force is a constant for all load conditions, and taking the case of an elevator operated by an alternating current motor, wherein the dynamic braking action is absent, and the electro-mechanical brake depended on to retard and stop the car, this retarding force which is a constant for all load conditions is not at all satisfactory since it results in unpleasant shocks and jars to the passengers in the car, and it is most difficult to stop the car level with a landing, particularly where the car is controlled by an automatic push button system. Furthermore it is the common practice to employ a dash pot to retard the full power of the brake and effect an initial light application thereof, this practice being dangerous since the dash pot is liable to stick and hold the brake off. With the present invention I overcome the above noted objectionable features, by applying the brake light or hard depending on the load in the car and the direction of car travel, thus obtaining a gradual stop without shock or jar to the passengers, and allowing a uniform slide of the car through the brake, thereby greatly assisting in the operation to effect an exact car landing.

Referring now to the accompanying drawings, Figure 1, illustrates in a more or less diagrammatical manner, an elevator system embodying the brake apparatus together with a system of control therefor constructed and arranged in accordance with the present invention; Fig. 2 illustrates an end view of a certain part of Fig. 1, Figs. 3, 4 and 5, illustrate a modified arrangement, and Fig. 6 illustrates a further modification.

Referring now to Fig. 1, it comprises an elevator car C adapted for operation by any suitable means such as an electric motor M through any well known type of hoisting apparatus. Electro-magnetic reversing switches R R' operate in a well known manner to control the motor to operate the car in an ascending and descending direction, the switch R controlling the car in ascending, and the switch R' for descending direction of travel. Windings 1, 1' to operate these switches, are controlled by means of a car switch S.

Coming now to the parts which form more particularly the present invention; it comprises the electro-mechanical brake apparatus which as a whole I will designate B. The brake comprises a pair of pivoted brake shoes 2, 2', adapted to be applied to a brake pulley 3, by means of springs 4, 4' respectively, carried by a brake rod 5. It will be pointed out that the brake applying springs 4, 4' are adjusted initially by means of nuts 6, 6' so that the retarding action of the shoe 2 is light, and that of the shoe 2' hard.

Independent brake magnets 7, 7' through connections 8, 8' respectively, operate to release the brake shoes 2, 2' from the brake pulley. The brake shoes 2, 2' are thus controlled independently by the brake magnets 7, 7' respectively.

Now I propose automatically to vary the retarding force or power of the brake springs 4, 4' in accordance with the load in the car, and further to vary the power of these springs oppositely, that is to say for example, as the power of the spring 4 is increased, the power of the spring 4' is decreased. In order to accomplish the above desired result, the elevator car is arranged to have a certain amount of movement independently of the hoisting apparatus, which range of movement is greater or less, according to the load in the elevator car. One manner of accomplishing this result is to provide the car with a platform P pivoted at 9, the movable or free end thereof being actuated more or less according to the load thereon, against the action of a spring 10. The brake rod 5, is provided with screw threads 5', engageable by a rotatable adjusting drum 11, the latter being held against sidewise movement by fixed members 12. The drum 11 is operatively connected with the movable car platform P, by means of a standing cable 13, which extends the length of the elevator hatchway, one end being secured to the drum 11 and the other end to overhead frame work 14, the standing cable being actuated by the movable platform P through a rocker arm connection 15 which is in the form of a cable traveler.

Movement of the platform P, due to the load thereon effects rotation of the drum 11, in an anti-clockwise direction, (as viewed from the right end of the rod 5,) thereby moving the rod 5 longitudinally toward the right hand, the rod being held against rotation by fixed members 15, engaging slots 16 in the rod. This movement of the rod 5, varies the power of the springs 4, 4' oppositely, since it increases the power of the spring 4, and decreases the power of the spring 4'. Thus with a maximum load on the platform P, the relative strength of the springs 4, 4' is just the opposite to that with only a light load on the platform, this being so, for with a maximum load, the power of the spring 4 is such as to effect a hard braking action and the power of the spring 4' is such as to effect a light braking action.

As the load is removed from the platform P, a weighted arm 17 attached to the drum 11 acts to rotate the drum in a clockwise direction and move the rod longitudinally in a left hand direction and in this manner, assuming for example only a light load on the platform, the relative adjustment of the springs is made normal as illustrated in the drawings.

It will be noted that an independent brake magnet for each brake shoe provides a means of control whereby either a light or hard braking action can be had, and thus means are at hand to effect a harder braking action for a heavy load descending and a light load ascending than for light load descending and a heavy load ascending. It will be noted from the above statement, that the braking actions, taking load for load are opposite for reverse directions of car travel.

In accomplishing the braking actions above set forth, an automatic system of control is provided, whereby brake shoe 2' is applied to retard the car for ascending direction of travel, brake shoe 2 being held off as hereinafter described, and brake shoe 2 is applied to retard the car for descending direction of travel, brake shoe 2' being held off at this time, it being seen therefore that the brakes are controlled to apply independently, dependent on the direction of car travel. The automatic system of control for the brake apparatus comprises auxiliary contacts 18, 19 and 20 controlled by the up reversing switch R; and auxiliary contacts 21 and 22 controlled by the down reversing switch R'. A relay H controlling contacts 23, 24, is provided with a winding 25, whose circuit is controlled by the auxiliary contacts 18, a self-holding circuit for the winding being controlled by a normally open switch 26, operable by a usual type of car-operated centrifugal governor G. An additional relay J controlling contacts 27, is provided with a winding 28 controlled by the auxiliary contacts 22 operable by the down reversing switch R'. The relay J is provided with a dash pot 29 which allows the relay to operate quickly to close-circuit its contacts, but to delay or retard its operation to open-circuit the said contacts.

Supply mains from any suitable source are designated + and —.

Consider now a light load in the car and the reversing switch R closed to effect operation of the car in ascending direction. The reversing switch being closed, closes the auxiliary contacts 18, 19 and 20. The contacts 19 and 20 close circuits to the brake windings 7, 7' respectively, thus effecting the release of the brake shoes for the pulley. The auxiliary contacts 18 close a circuit for the relay winding 25 which may be traced as follows: + main, wire 30, contacts 18, wire 31, relay winding 25, and then to the — line.

The relay operates and closes its contacts which establish a self-holding circuit for the winding 25 and also a parallel circuit for the brake winding 7, these circuits being independent of the reversing switch R after the latter is once closed. The self-holding circuit may be traced as follows; + main, wire 32, governor switch contacts which close very shortly after the car starts, wire 33, wire 34, contacts 24, wire 35, junction 35' and through winding 25 to the — line. The parallel circuit for the brake winding 7 is the same as the circuit just traced up to the junction 33', thence contacts 23, wire 36, to junction 36' where it connects with a wire 37 which initially closes a circuit to the winding 7 when the reversing switch closes its auxiliary contacts 19.

With this arrangement of circuits, when the reversing switch is opened, the circuit to the brake winding 7' is broken at the contacts 20 and the spring 4' applies the shoe hard, this braking action bringing the light ascending car to a gradual stop. The circuits for the brake magnet 7 is maintained by the relay contacts after the reversing switch opens and since the self-holding circuit for the relay winding is controlled by the governor contacts, the brake shoe 2 is thus held off until the car is substantially at rest at which time the governor contacts 26 will open.

Consider now a heavily loaded ascending car. Loading the platform acts automatically to increase the power of the spring 4, and decrease the power of the spring 4'. The change of load has no effect on the controlling circuits whatsoever, thus the operation to apply the brake is the same as described above for the light load conditions. However, under the heavy load condition the brake shoe 2' is applied lightly by the spring 4', and when the car has come substantially to rest, the brake shoe 2 is applied, thus giving an additional brake which is absolutely necessary to hold the heavy load at rest, the light braking action of the shoe 2' being of itself not sufficient to hold the heavy load. Thus far, it will be seen that for an ascending car under all load conditions, the car is retarded in its movement and brought substantially to rest by the action of the brake shoe 2' and spring 4'.

Consider now a lightly loaded car and the reversing switch R' closed to effect operation of the car in a descending direction. The reversing switch R' being closed, closes the auxiliary contacts 21, 22, the former closing a circuit to the brake winding 7, and the latter closing a circuit to the relay winding 28, the latter circuit being traced as follows: + main, wire 30, contacts 22, wire 36'', and the relay winding 28 to the line. The relay operates quickly to close-circuit contacts 27 which closes a circuit for the brake winding 7' as follows: + main, wire 37, contacts 27, wires 38 and 39, brake winding 7' thence to — line. Now when the reversing switch R' opens, the circuit to the brake winding 7 is opened at the contacts 21, and the spring 4 applies the brake shoe lightly. The slow action of the relay J to open its contacts, introduces a time period through which the brake shoe 2' is held off by its magnet 7', this time period being sufficient to allow the shoe 2 to retard and bring the car to a stop, before the shoe 2' is applied.

Consider now the case of a heavily loaded descending car. Loading the platform acts automatically to increase the power of the spring 4 and decrease the power of the spring 4', and thus the spring 4 will apply the brake shoe 2 hard, and bring the car to a gradual stop, the shoe 2' being held off as above described.

In the modified construction illustrated in Figs. 3, 4 and 5, two independently operable brakes B' B'' are employed as in the arrangement just described, the main difference being that in the modification, each brake comprises a pair of brake shoes 40, 41, a pair of brake springs 40', 41', and electromagnets 7, 7'. Brake pulleys 3, are attached to a common shaft A (see Fig. 5). Each brake is provided with a pair of adjusting rods 42, 42' each pair having oppositely pitched threads. An adjusting nut 43 is provided with threads engaging and connecting the pair of rods 42, and an adjusting nut 43' is arranged in a like manner to connect the pair of rods 42'. Each adjusting nut is provided with an arm 44, the two arms being connected through a slot and pin connection 45, with the standing cable 13 arranged as in Fig. 1.

The springs 40' are normally set to effect a light braking or retarding action, springs 41' being normally set to effect a hard braking or retarding action.

An upward pull on the cable rotates the adjusting nuts 43, 43' in opposite directions, the nut 43 having the pair of rods 42 toward each other to increase the power of the springs 40', and the nut 43' moving the rods 42' outwardly or away from each other to decrease the power of the springs 41'. A spring 46 acts to return the arms 44 and connected parts to normal position as indicated in the figures. The brake magnets 7 and 7' are controlled in the same manner as those in Fig. 1, and the braking actions obtained are substantially the same as with the construction illustrated in Fig. 1.

In the modification illustrated in Fig. 6, brake springs 47 which are arranged on the brake rod 48 in the usual and well known manner, are adjusted by the induction action in the brake winding 49 itself, this action being brought about by establishing a parallel circut to the brake winding, this circuit forming a discharge circuit for the brake winding when the latter is disconnected from the supply mains. The self-induction action, effects a light initial application of the brake, or in other words the full power of the brake is retarded. I am aware that the above principle is old in the art, but I propose to vary the initial braking action in accordance with the load in the car and to provide selective initial braking actions so that means are at hand to effect a harder initial braking action for a heavy load descending and a light load ascending, than for a light load descending and a heavy load ascending, these results I believe being new.

I accomplish the above desired result by providing two sets of resistances which are varied oppositely and in accordance with the load in the car, these being automatically controlled independently to form a discharge circuit for the brake winding, dependent on the direction of car travel.

The two sets of resistances are designated 50 and 51. In order to vary these resistances oppositely and in accordance with the load in the car, a usual spring 51 is interposed between the car frame 52 and the hoisting cable 53. Movement of the car independently of the hoisting apparatus, as by placing a load thereon, acts to compress the spring 51 and thereby rocks a Y-shape controller lever 54 in an anti-clockwise direction, through the intermediary of a link 55. This movement of the lever varies the resistances 50 and 51 oppositely, and in accordance with the load in the car, these resistances being connected in independent circuits so that the sections comprising the set 51 are introduced into one discharge circuit while the sections comprising the set 50 are cut out of the other discharge circuit, and it is seen that in this manner, the resistances of the two independent discharge circuits are varied oppositely.

These resistances it may be said are controlled indirectly by the reversing switches, and directly by a switch L, adapted to be actuated by the reversing switches.

The switch L comprises 2 pair of contacts 56, 57, one contact of each pair being carried on an arm 64 adapted to rock on a pivot 65, and the other two contacts being fixed. Operation of the up reversing switch R actuates the arm 64 to close contacts 57, and operation of the reversing switch R' actuates the arm 64 to close contacts 56, the switch remaining in an actuated position when the switch last operating the same is opened, through the action of a weighted arm 66 connected thereto.

Auxiliary contacts 58 connect the brake winding with the supply mains + and −, upon the operation of either of the reversing switches to operate the car.

The contacts 56 and 57 control the two independent discharge circuits for the brake winding, the contacts 56 controlling the circuit having the variable resistance 51, and contacts 57 controlling the circuit having the variable resistance 50. Thus with the parts assuming the position as indicated in the drawing with the contacts 57 closed, which corresponds to ascending direction of car travel, and again assuming a lightly loaded car, the braking action for this condition will be hard, since all the resistance 50 is contained in the brake discharge circuit, which resistance is high so as to reduce the value of the induced current so that the induction action is weakened to such an extent as to allow the brake springs 47 to apply with practically full power. It will be mentioned here that the less the resistance of the brake discharge circuit the stronger the induction action, and the stronger the latter the lighter the initial braking action or retarding force, and hence the greater the resistance of the discharge circuit, the weaker the induction action, and the weaker the latter, the stronger the initial braking action or retarding force. The brake discharge circuit controlled by the contacts 57 is as follows: starting from one terminal say 59 of the brake winding, wires 67 and 68, contacts 57, wire 69 through the variable resistance 50 to a contact 61 carried by the controller arm 54', and wire 70 to brake terminal 71.

With a heavily loaded car ascending, the initial braking action is light, since for this condition practically all of the resistance 50 included in the circuit controlled by the contacts 57, is short circuited by the contact 61.

For descending direction of car travel, the brake discharge circuit is controlled by the contacts 56, this circuit including the variable resistance 51, the other brake discharge circuit being open at the contacts 57, for this direction of car travel. The manner in which the desired braking actions are effected for descending load conditions is thought to be obvious in view of the detailed description already given for the ascending loads.

Having thus described the invention, and without limiting myself to details of construction and arrangements of parts, what I claim as new and desire to secure by Letters Patent of the U. S. is:—

1. Brake apparatus comprising a rotatable member, friction means coacting with the said member, plural devices providing relatively light and hard braking pressures, and means to control the pressure devices to operate successively to apply their pressure.

2. The combination with the elevator car, brake apparatus therefor comprising a brake pulley, friction means coacting with the pulley, self-acting power means to apply the friction means to the pulley, and means to control the power means to effect a harder braking action for a heavy load descending and a light load ascending than for a heavy load ascending and a light load descending.

3. Brake apparatus comprising a rotatable member, friction means coacting with the said member, plural devices providing relatively light and hard braking pressures, and means to control either pressure device to operate separately to effect initial braking action.

4. Brake apparatus comprising a rotatable member, a member coacting therewith to retard the same, mechanical self contained power means to apply the latter named member to the first named member, and means responsive to the load to vary the action of the mechanical means.

5. The combination with a load carrying device, a rotatable member separate therefrom, and self-contained power means made variable by the load, to retard the said rotatable member.

6. The combination with a load carrying device, a rotatable member separate from the said device, self-contained pressure means to retard the same, and means responsive to the load to vary the retarding action of the pressure means.

7. The combination with an elevator car, brake apparatus therefor comprising a brake pulley separate from the car, a member coacting with the pulley to retard the same, a self-contained power device to apply the member to the pulley and means automatically to vary the retarding action of the power device.

8. The combination with an elevator car, hoisting apparatus therefor, brake apparatus for the car comprising a brake pulley separate from the car, a member to retard the pulley, a self-contained power device to apply the member to the pulley and means to vary the retarding action of the power device in accordance with the load.

9. Brake apparatus comprising a brake pulley, friction means coacting therewith, and means providing plural forces to apply either light or hard pressure to the friction means.

10. Brake apparatus comprising a brake pulley, friction means coacting therewith, and plural means operable successively to effect relatively light and hard application of the second named friction means to the pulley.

11. Brake apparatus comprising a brake pulley, friction means coacting therewith, and independent power devices operable in accordance with the load acted upon by the brake, to apply the second named friction means to the brake pulley.

12. Brake apparatus comprising a brake pulley, friction means coacting therewith, independent power devices to effect relatively light and hard application of the second named friction means to the brake pulley, and means to regulate the independent power devices.

13. Brake apparatus comprising a brake pulley, friction means coacting therewith, power devices to apply the said friction means to the brake pulley to retard the latter, and means to vary the retarding action of the power devices oppositely.

14. Brake apparatus comprising a brake pulley, friction means coacting therewith, power devices to apply the said friction means to the brake pulley, and means operable automatically to oppositely vary the relative strength of the power devices.

15. Brake apparatus comprising a brake pulley, friction means coacting therewith, power devices to apply the said friction means to the brake pulley, and means to vary the relative strength of the power devices oppositely and in accordance with the load acted upon by the brake.

16. Brake apparatus comprising a brake pulley, friction means coacting therewith, brake springs to apply the said friction means to the pulley, and means to vary the power of the springs oppositely.

17. Brake apparatus comprising a brake pulley, a brake shoe, a spring acting of itself to apply the shoe to the pulley, and means to vary the action of the spring in accordance with the load acted upon by the brake.

18. Brake apparatus comprising a brake pulley, a friction means, and springs to apply the friction means to the pulley, said springs being normally adjusted to exert different degrees of pressure.

19. The combination with an elevator car, hoisting apparatus therefor, a brake pulley, a member coacting therewith to retard the same, a brake spring, and a connection between the car and spring to vary the tension of the spring.

20. The combination with an elevator car, hoisting apparatus therefor, a brake pulley, friction means coacting therewith to retard the same, a brake spring, and a connection between the car and spring to vary the tension of the spring in accordance with the load in the car.

21. The combination with an elevator car, hoisting apparatus therefor, a brake pulley, friction means coacting therewith, springs to apply the said friction means to the pulley, and a connection between the car and said springs to vary the tension thereof.

22. The combination with an elevator car, hoisting apparatus therefor, a brake pulley, friction means coacting therewith, springs to apply said friction means to the brake pulley, and a connection between the car and said springs to increase the power of one spring, and decrease the power of the other.

23. The combination with an elevator car, a brake pulley, friction means coacting therewith, springs to apply said friction means to the pulley, and a connection between the car and said springs, to vary the power of the springs oppositely and in accordance with the load in the car.

24. Brake apparatus comprising a brake pulley, members coacting therewith to retard the same, means to apply the said members to the pulley, and means to effect application of the said members successively.

25. Brake apparatus comprising a brake pulley, members coacting therewith to retard the same, means to apply said members to the pulley, and means controlled automatically to effect application of the said members successively.

26. The combination with a load carrying device, a brake therefor comprising a rotatable member, members coacting therewith, independent members varying in power to apply the said members to the rotatable member, reversing mechanism for the load carrying device, and means controlled by the reversing mechanism to effect application of the said members successively.

27. The combination with a load carrying device, a brake therefor comprising a brake pulley, a pair of brake shoes, an electro-responsive device to actuate each shoe, reversing mechanism for the load carrying device, and circuits for the electro-responsive devices, controlled by the reversing mechanism to effect application of the shoes successively.

28. The combination with an elevator car, a hoisting motor therefor, a brake pulley, brake shoes controlled to apply independently, and means variable in accordance with the load to apply the said shoes to the brake pulley.

29. The combination with an elevator car, a hoisting motor therefor, a brake pulley, brake shoes controlled to apply independently, independent members exerting different degrees of pressure to apply the shoes to the pulley, and means, oppositely to vary the relative pressure of the said members.

30. In combination, a brake apparatus comprising a brake shoe, an electro-responsive device to release the shoe, contacts to control a circuit for the electro-responsive device, electro-responsive means to actuate the contacts, means to control a circuit for the said electro-responsive means, a centrifugal speed governor, contacts controlled by the governor, and a self-holding circuit for the electro-responsive means, controlled by the governor controlled contacts.

In testimony whereof I have signed my name to this specification in the presence of two subscribing witnesses.

ERNEST L. GALE, JR.

Witnesses:
HENRY J. RITCHIE,
GEO. S. SMITHERS.